US011325534B2

(12) United States Patent
Lettis et al.

(10) Patent No.: US 11,325,534 B2
(45) Date of Patent: May 10, 2022

(54) ASSEMBLY, METHOD FOR ASSEMBLING AND DISASSEMBLING SUCH AN ASSEMBLY, AND EXTERNAL REAR VIEW DEVICE AND VEHICLE WITH SUCH AN ASSEMBLY

(71) Applicant: SMR Patents S.à.r.l., Luxembourg (LU)

(72) Inventors: Andrew Lettis, Portchester (GB); Callum Scott-Collins, Portchester (GB); Graham Rehill, Portchester (GB)

(73) Assignee: SMR Patents S.à.r.l., Luxembourg (LU)

( * ) Notice: Subject to any disclaimer, the term of this patent is extended or adjusted under 35 U.S.C. 154(b) by 446 days.

(21) Appl. No.: 16/180,857

(22) Filed: Nov. 5, 2018

(65) Prior Publication Data

US 2019/0071016 A1   Mar. 7, 2019

Related U.S. Application Data

(63) Continuation of application No. PCT/EP2018/067845, filed on Jul. 2, 2018, and a
(Continued)

(30) Foreign Application Priority Data

Nov. 14, 2016   (EP) .................................... 16198759

(51) Int. Cl.
*B60R 1/06*   (2006.01)
*B60R 1/12*   (2006.01)
(Continued)

(52) U.S. Cl.
CPC ................ *B60R 1/06* (2013.01); *B60R 1/074* (2013.01); *B60R 1/1207* (2013.01); *B60Q 1/34* (2013.01);
(Continued)

(58) Field of Classification Search
CPC combination set(s) only.
See application file for complete search history.

(56) References Cited

U.S. PATENT DOCUMENTS 7,073,914 B2 *   7/2006   Pavao .................. B60Q 1/2665
                                                              359/841
8,579,444 B2 *   11/2013   Lettis ........................ B60R 1/06
                                                              359/871

(Continued)

FOREIGN PATENT DOCUMENTS

DE   102013225798 A1   6/2015
EP   2253510 A1   11/2010
EP   2399780 A1   12/2011

OTHER PUBLICATIONS

International Search Report dated Aug. 7, 2018 of International application No. PCT/EP2018/067845.
(Continued)

*Primary Examiner* — Monica E Millner
(74) *Attorney, Agent, or Firm* — Jones Day

(57) ABSTRACT

An assembly includes a head assembly for an external rear view device to be attached to a motor vehicle, a lower casing element, an upper casing element, an articulation assembly, a bezel assembly for carrying at least one rear view element, and a hinge connection between the bezel assembly and a first sub assembly provided by at least the lower casing, the articulation assembly and attachment means with the articulation assembly being mounted on the attachment means or the attachment means being mounted on the articulation assembly.

23 Claims, 13 Drawing Sheets

Related U.S. Application Data continuation-in-part of application No. 15/922,366, filed on Mar. 15, 2018, now Pat. No. 10,661,714, which is a continuation-in-part of application No. 15/800,413, filed on Nov. 1, 2017, and a continuation-in-part of application No. 15/607,894, filed on May 30, 2017, now Pat. No. 10,744,947, and a continuation-in-part of application No. 15/603,751, filed on May 24, 2017, now Pat. No. 10,759,345, and a continuation-in-part of application No. 15/439,188, filed on Feb. 22, 2017, now Pat. No. 10,703,281, and a continuation-in-part of application No. 15/000,754, filed on Jan. 19, 2016, now Pat. No. 9,796,333, and a continuation-in-part of application No. 14/936,024, filed on Nov. 9, 2015, now Pat. No. 9,656,601, and a continuation-in-part of application No. 14/374,376, filed on Jul. 24, 2014, now Pat. No. 9,181,616, and a continuation-in-part of application No. 14/022,896, filed on Sep. 10, 2013, now abandoned.

(51) Int. Cl.
*B60R 1/074* (2006.01)
*B60Q 1/34* (2006.01)

(52) U.S. Cl.
CPC ............... *B60R 2001/1223* (2013.01); *B60R 2001/1253* (2013.01)

(56) References Cited

U.S. PATENT DOCUMENTS

| | | | | |
|---|---|---|---|---|
| 9,216,690 | B2* | 12/2015 | Schmierer | B60R 1/06 |
| 9,827,909 | B2* | 11/2017 | Szmolenszki | B60R 1/062 |
| 2010/0296189 | A1* | 11/2010 | Lettis | B60R 1/06 |
| | | | | 359/876 |

OTHER PUBLICATIONS

Written Opinion dated Aug. 7, 2018 of International application No. PCT/EP2018/067845.

* cited by examiner

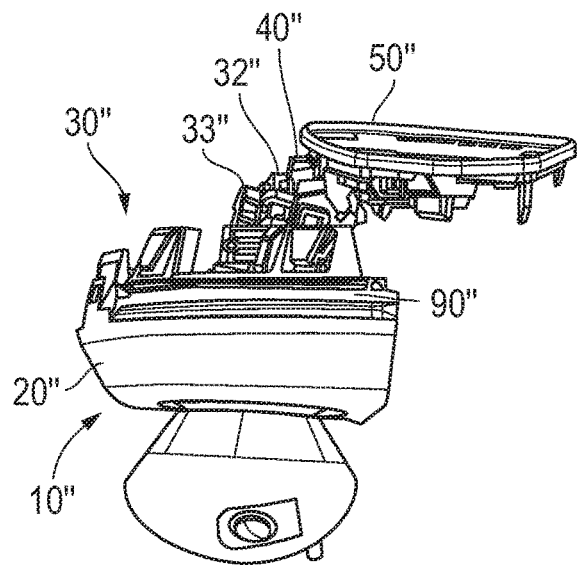
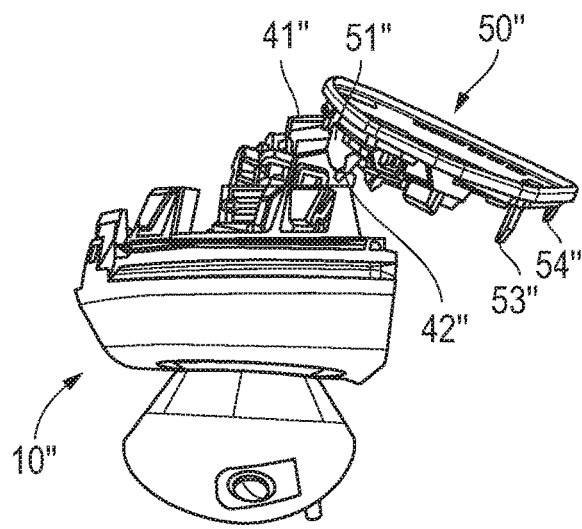
FIG. 8A    FIG. 8B
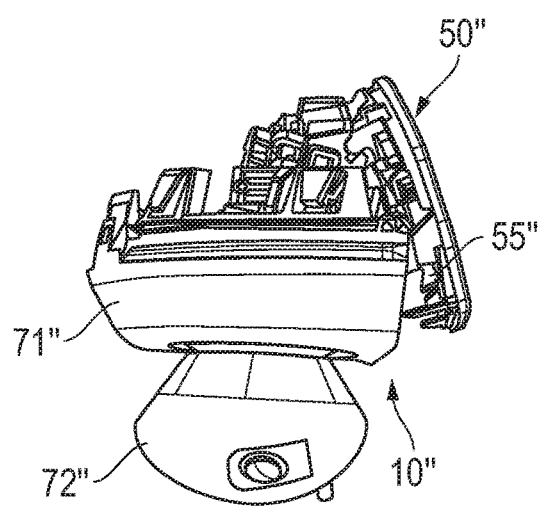
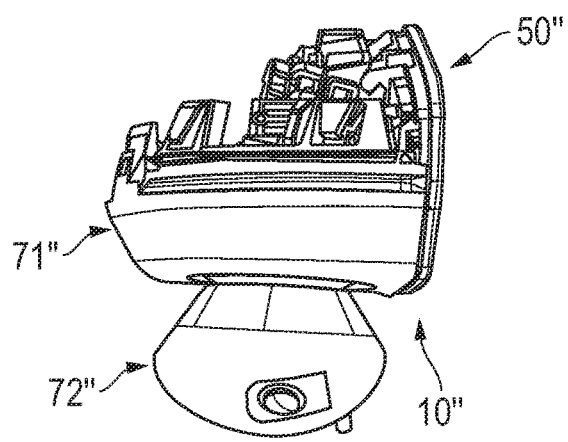
FIG. 8C    FIG. 8D

ASSEMBLY, METHOD FOR ASSEMBLING AND DISASSEMBLING SUCH AN ASSEMBLY, AND EXTERNAL REAR VIEW DEVICE AND VEHICLE WITH SUCH AN ASSEMBLY

CROSS-REFERENCE TO RELATED APPLICATIONS

This application is a continuation of International Patent Application No. PCT/EP2018/067845, filed Jul. 2, 2018, which claims the benefit of priority to German Patent Application No. 10 2017 114 746.2, filed Jun. 30, 2017, and this application is a continuation-in-part of U.S. patent application Ser. No. 15/922,366, filed Mar. 15, 2018, which is a continuation-in-part of U.S. patent application Ser. No. 15/800,413, filed Nov. 1, 2017, which is a continuation-in-part of U.S. patent application Ser. No. 15/607,894, filed May 30, 2017, which is a continuation-in-part of U.S. patent application Ser. No. 15/603,751, filed May 24, 2017, which is a continuation-in-part of U.S. patent application Ser. No. 15/439,188, filed Feb. 22, 2017, which is a continuation-in-part of U.S. patent application Ser. No. 15/000,754, filed Jan. 19, 2016, which is a continuation-in-part of U.S. patent application Ser. No. 14/936,024, filed Nov. 9, 2015, which is a continuation-in-part of U.S. patent application Ser. No. 14/374,376, filed Jul. 24, 2014, which is a continuation-in-part of U.S. patent application Ser. No. 14/022,896, filed Sep. 10, 2013, which is a National Stage Entry of International Patent Application No. PCT/AU2013/000047, filed Jan. 23, 2013, which claims the benefit of priority to European Patent Application No. 16198759.9, filed Nov. 14, 2016, German Patent Application No. 102012108480.7, filed Sep. 11, 2012, and Australian Patent Application No. 2012900267, filed Jan. 24, 2012, each of which is hereby incorporated by reference in its entirety for all purposes.

BACKGROUND

1. Field of the Invention

The following description relates to an assembly including a head assembly for an external rear view device to be attached to a motor vehicle, The assembly may include a lower casing element, an upper casing element, an articulation assembly and a bezel assembly for carrying at least one rear view element. A method of assembling and disassembling, a rear view device, and a vehicle are also described.

2. Related Art

FR 2 605 567 A1 relates to an external rear view mirror that is connected to a motor vehicle by a base and a ball-and-socket arrangement. The ball of said arrangement is generally hollow and relatively large with respect to base to allow smaller bases to be used and to allow attachment to the vehicle internally of the base. The mirror is mounted on the ball by way of a rod, and a pressure-piece within the ball and held by a spring. The ball is formed from two parts connected together at a snap-fit.

EP 2 492 145 B1 refers to an external rear view mirror with a mirror head and a mirror base, which are covered with at least one body element in the form of a body frame, a body cap and a mirror base cover, and a mirror glass that is installed rigidly relative to the mirror head. The mirror head rests on the mirror base; the body cover of the mirror head is composed of multiple pieces of the body frame and the body cap; and the mirror base is equipped with a mirror base cover, wherein the body cap has an opening designed for the passage of the mirror base and the mirror base cover. The mirror base is rigidly connected to a mirror carrier that carries an electrical glass adjustment drive, wherein the glass adjustment drive is connected to at least one body element.

Another external rear view mirror assembly for a motor vehicle having a mirror base or foot provided for arrangement on the motor vehicle and a mirror head arranged on the mirror foot as well as a mirror glass accommodated in the mirror head and arranged rigidly and fixed non adjustably with respect thereto, is known from EP 2 492 144 B1. At least one articulation is provided between the mirror head and the arrangement of the mirror foot on the motor vehicle, said articulation comprising a total of two articulation axes, the direction vectors of said articulation axes being independent of each other, and wherein the two articulation axes are associated, jointly and/or independently of each other, to swiveling at least the mirror head from an operating position to a swung-in position and vice versa, to swinging-in at least the mirror head in and against the direction of motion, as well as adjusting an individual adjusting position of at least the mirror glass by adjusting the mirror head depending on, e.g., the seating position and the height of a driver of the motor vehicle, as well as having a first adjusting drive driven by an electric motor and associated to a first articulation axis of the two articulation axes and having a second adjusting drive driven by an electric motor and associated to a second articulation axis of the two articulation axes.

An exterior mirror assembly with an optical display having a mirror base and a mirror head and at least one housing cover having a recess for a reflective element is described by DE 10 2013 225 798 A1, where the optical display behind the reflective element is arranged inside the mirror head so that light of the optical display passes through the reflective element, and where the reflective element is mounted on a support plate with an articulation means and the optical display is arranged in a space between the articulation means and the support plate.

An exterior rearview mirror assembly according to WO 2013/126719 A2 includes a non-movable portion, a movable portion and a mirror head. The non-movable portion is configured for attachment at an exterior portion of a vehicle and the movable portion is movable relative to the non-movable portion. The mirror head is movable relative to the movable portion, and a mirror reflective element is fixedly attached at the mirror head. A first actuator is operable to move the movable portion relative to the non-movable portion about a first axis and a second actuator is operable to move the mirror head relative to the movable portion about a second axis. The first and second actuators are cooperatively operable to move the movable portion about the first axis and to move the mirror head about the second axis, and the mirror reflective element moves in tandem with movement of the mirror head.

EP 2 399 780 A1 describes an exterior rearview mirror that has a two-part exterior rearview mirror housing which has an opening for a mirror glass. The exterior rearview mirror housing accommodates a base support, on which the mirror glass is arranged in an adjustable manner. Snap-in connections are provided between the housing parts and between each one of the housing parts and the base support.

WO 2016/088115 A2 refers to a method for manufacturing an automotive mirror, in particular a side mirror, including the following steps: forming a printed circuit board as flexible printed circuit board with n+1 branches, $n \in \mathbb{N}$;

providing n modules each having at least one electronic element housed within a plastic casting and connected to conducting paths on at least one of the surfaces of the plastic casting, and at least one standard gripping point, guiding structure, snap connection element and/or sealing member provided by the plastic casting; connecting up to n of said branches to one module each and connecting one branch to cables or a cable harness to be connected to a power supply and/or a control unit outside the mirror; providing mirror parts free of electronic elements; and assembling the mirror parts and the modules.

SUMMARY

In one aspect, a hinge connection between the bezel assembly and a first sub assembly provided by at least the lower casing, the articulation assembly and attachment means, with the articulation assembly being mounted on the attachment means or the attachment means being mounted on the articulation assembly, and at least one snap, latch and/or clip connection between the bezel assembly and the first sub assembly to provide a second sub assembly, and between the bezel assembly and the upper casing element and/or between the upper casing element and the attachment means and between the upper casing element and the lower casing element to provide a third sub assembly in form of the head assembly.

The hinge connection may be provided between one end of the bezel assembly and a cradle of the attachment means and allows for a rotation of the bezel assembly, preferably between an upper end of the bezel assembly and an upper end of the cradle to allow for a downward rotation of the bezel assembly to attach the bezel assembly to the lower casing via the at least one snap, latch and/or clip connection.

The hinge connection may be provided by at least one opening and/or slot, such as 4 openings and/or slots, with preferably each pair of one opening and one slot having a narrow keyway cross section, and an axle, hook and/or a tab suited to be inserted into the opening and/or slot. The opening and/or slot may be provided by the cradle such that the axle and/or tab of the bezel assembly can be inserted from above into the opening and/or slot.

A first snap, latch and/or clip connection between the bezel assembly may be provided, such as between the lower end of the bezel assembly, and the lower casing element, and/or a second snap, latch and/or clip connection between the bezel assembly, such as between the lower end of the bezel assembly, and a lower cradle of the attachment means, and/or a third snap, latch and/or clip connection between the bezel assembly, such as between the lower end of the bezel assembly, and a lower cradle of the attachment means as well as the lower casing element, and/or a forth snap, latch and/or clip connection between the bezel assembly, such as between the upper end of the bezel assembly, and the upper casing element, and/or a fifth snap, latch and/or clip connection between the attachment means, such as between an upper cradle of the attachment means, and the upper casing element, and/or a sixth snap, latch and/or clip connection between the lower casing element and the upper casing element, and/or a seventh snap, latch and/or clip connection between a light module, such as a turn signal indicator module and/or a blind spot monitor module, and the lower casing element and/or the upper casing element, and/or an eighth snap, latch and/or clip connection between a Bluetooth module and the light module, the lower casing element and/or the upper casing element.

The lower casing element may be provided with at least one hole functioning as a drain hole and/or enabling relieving the first, third, sixth, seventh and/or eights snap, latch and/or clip connection.

Further it is proposed that a button and/or functional module, including a light module, in particular in form of a turn signal indicator module and/or a blind spot monitor module, a camera module, a Bluetooth module and/or a sensor module, such as a temperature sensor, preferably moveably insertable into the hole.

The turn signal indicator module and the blind spot monitor module may be formed as a single unit immovably attached to each other in form of a combined module and share at least one of a light source or a printed circuit board.

The first, third, sixth, seventh and/or eighth snap, latch and/or clip connection may include at least one element in the region of a rim of the lower casing element and/or integrally formed with the lower casing element, and/or the first, second, third and/or forth snap, latch and/or clip connection may include at least one element integrally formed with the bezel assembly.

Attachment of the bezel assembly to the lower casing may be fixing the button and/or the functional module within the head assembly and/or closing a gap between the upper and/or lower casing on the one side and the bezel assembly on the other side, and/or at least one clip element, preferably of the bezel assembly, and/or at least one nose, shoulder or projection of the button and/or the functional module is suited for fixing the button and/or the functional module.

The light module, such as the turn signal indicator module, may be provided with at least one, preferably arc shaped, first nose or projection engaging, a preferably U shaped recess of, a projection of the bezel assembly, and/or the light module, preferably the turn signal indicator module, is provided with at least one second nose, shoulder or projection engaging a further projection of the bezel assembly.

The light module may include one or more tabs and one or more clips, the lower casing element comprises one or more tab receiving portions, and the one or more tab receiving portions of the lower casing element are configured to receive the one or more tabs of the light module.

The light module may be configured to lock and attach to the lower casing element by pressing the light module on the lower casing element and sliding the light module with respect to the lower casing element, with, for example, the light module sliding along a curved edge of the lower casing element until one or more retaining clips are engaged, and/or preferably the light module being locked in position via a series of vertical control tabs along the lower casing element.

The third snap, latch and/or clip connection may be provided by at least one element integrally formed with the lower cradle, and/or the bezel assembly is provided with at least one first projection suited for extending through a bracket of the lower casing element and engaging the lower cradle, the bezel assembly may be provided with at least one second projection suited for being inserted into a recess provided by the lower casing element, and/or the bezel assembly may be provided with at least one shoulder suited to act as a stop element, preferably by abutting against the rim of the lower casing element; and/or the lower casing element may be provided with an extension suited for engaging the lower cradle, preferably for resting in a seat provided by the lower cradle when the second or third sub assembly is assembled.

The first projection, the second projection and the shoulder may be provided by a datum of the bezel assembly.

The forth snap, latch and/or clip connection may be provided by at least one hoop clip of the upper casing element into which the tab of the bezel assembly and/or at least one hook of the upper cradle can be inserted.

The fifth snap, latch and/or clip connection may be provided by at least one projection or ledge of the bezel assembly suited to engage the at least one hoop clip of the upper casing element.

A spring element may be acting on the bezel assembly.

In another aspect, a method for assembling the assembly includes: providing the first sub assembly, preferably with the turn signal indicator module attached to the lower casing, hinging the upper end of the bezel assembly into the first sub assembly, preferably via the cradle or upper cradle, rotating the lower end of the bezel assembly downwardly, in particular against the force of the spring element, and clipping the lower end of the bezel assembly at least to the lower casing element a to form the second sub assembly.

The method for assembling the head assembly may include the step of clipping the upper casing element onto the second sub assembly, in particular onto the bezel assembly and/or the cradle or upper cradle and the lower casing element.

In another aspect, a method of disassembling the assembly includes: relieving the connection between the lower end of the bezel assembly and the lower casing element, in particular the bezel assembly, the lower casing element and the lower cradle, through the hole and/or via the button and/or via the functional module within the lower casing element, and rotating the lower end of the bezel assembly, in particular via the force of the spring element, upwardly and hereby releasing the upper casing element.

The method may further include drawing the bezel assembly out of the hinge connection with the cradle or upper cradle.

In another aspect, a rear view device includes a head assembly where at least one rear view element is attached to the bezel assembly, with the rear view element includes a reflective element and/or a camera, and the articulation assembly being suited to move at least the at least one rear vision element.

In another aspect, a motor vehicle includes at least one rear view device, where at least the cradle or upper cradle is moveably attached to the motor vehicle via a foot assembly fixed to the motor vehicle.

The assembly of the invention allows for a consistent assembly and disassembly method without breaking or removing a reflective element attached thereto for service. Further, the assembly allows for either tier 1 manufacturer or final customer to assemble without special tools.

In various aspect and example, a bezel assembly is mounted on the top of a cradle attached to an articulation assembly supported by a lower casing element. This attachment makes use of a hinged mechanism allowing the bezel assembly to be rotated in order to be located at and clipped to the lower casing element creating a sub assembly in form of a rigid framework. Said sub assembly can be closed by clipping a scalp in form of an upper casing element thereon to form a new sub assembly. The advantage of this structure may be due to the fixed hinges providing a fixed rotation axis allowing consistent and repeatable assembly of the bezel assembly, which in turn allows for possible additional self docking positions for electrical connectors for heating means and/or lighting means and for the reflective element e.g. in form of an electrochromic mirror glass. Further, access holes, which are provided by drain holes positioned in the lower casing element, do provide access to bezel assembly securing clips in order to release the connection between the lower casing element and the bezel assembly such that a service solution is given to gain access to the internals of the assembly without damaging component parts thereof. Still further, scalp retaining clips are integrated into the hinge system of the bezel assembly, therefore during the disassembly rotation process of the bezel assembly, the scalp retaining clips disengage from the scalp by rotating and allowing for the scalp to be removed without damage. The bezel assembly can then be removed and/or replaced if required.

Thus, a simple hinged module in form of the assembly can be supplied separately from the remaining rear vision device components comprising at least one reflective element and/or camera, which can be in form of an electrochromic mirror glass. This allows late configuration at a car manufacturer or supplier to provide the required legal glass types resulting in reduced mirror assembly variants lineside.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

FIGS. 8A, 8B, 8C, and 8D are side views of a forth embodiment of an assembly of the invention demonstrating the attachment of a bezel assembly to a first sub assembly, in particular a cradle thereof, to provide a second sub assembly by rotating the bezel assembly;

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims. With respect to FIGS. 1A to 6B, a head assembly 70 to be used in a rear view device is mounted to a motor vehicle. Such a rear view device can be an external rear view mirror with an electrochromic mirror glass, but is not restricted thereto. Further, the whole head assembly 70 can be rotated around 1 or 2 axis relative to the motor vehicle, or a foot assembly may be fixed to the motor vehicle.

Figure 1A:
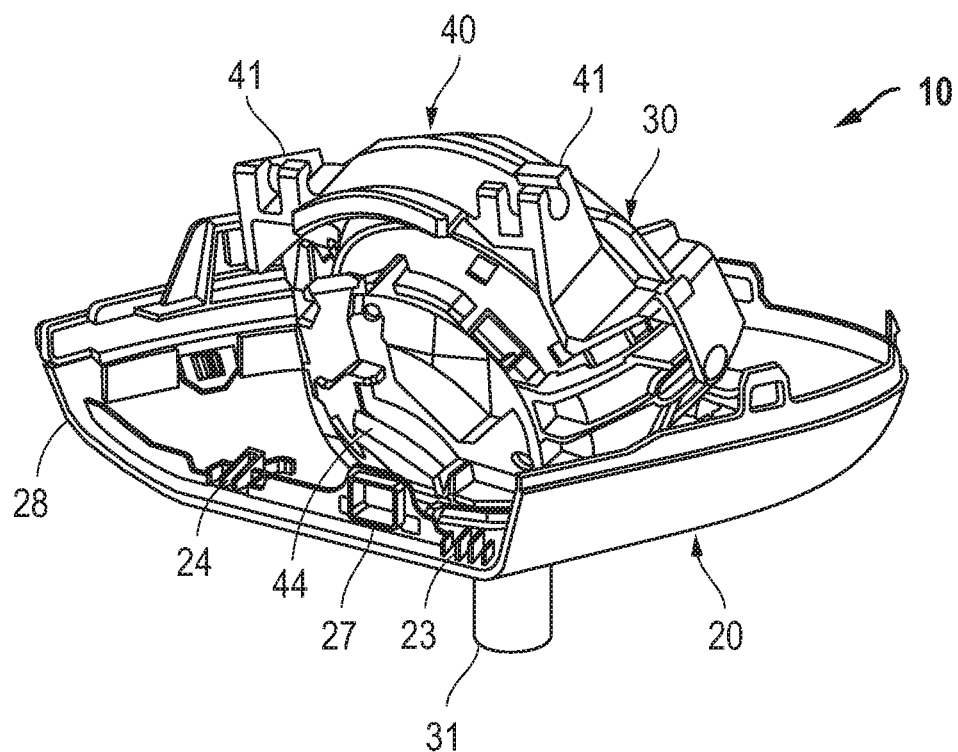
FIG. 1A is a perspective view of a first sub assembly of a first embodiment of a rear vision device of the invention.
Figure 1B:
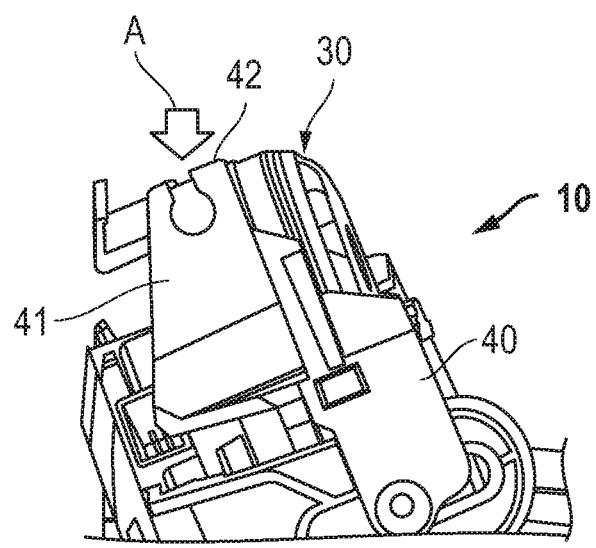
FIG. 1B is an enlarged side view of an upper part of the first sub assembly of the invention.
Figure 2A:
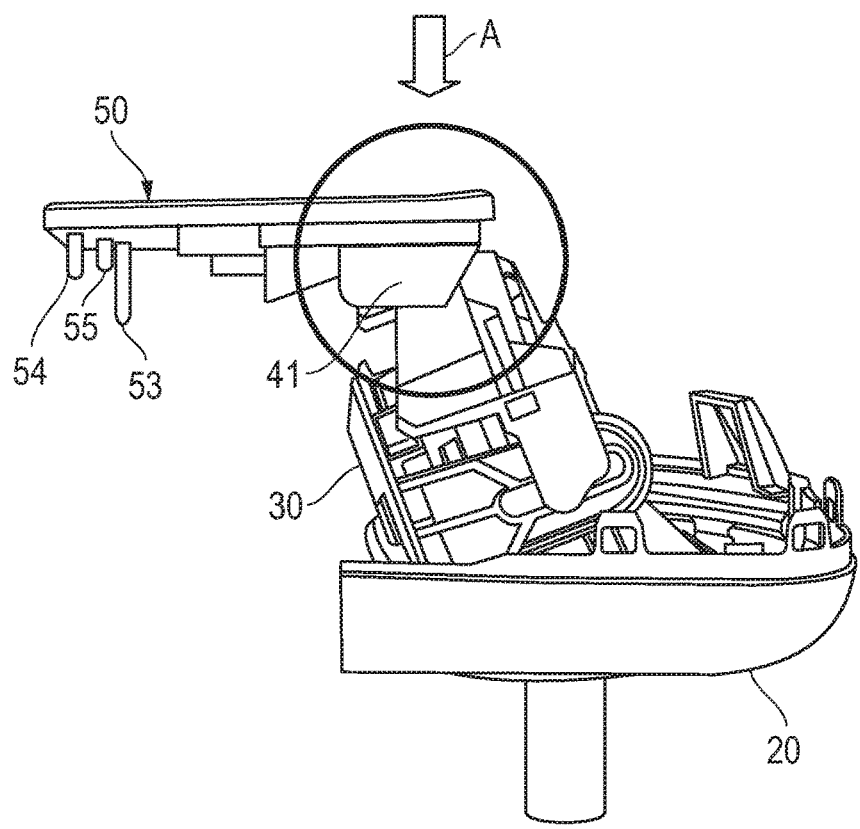
FIG. 2A is a side view of the first sub assembly assembly of FIG. 1a having a bezel assembly hinged thereon.
Figure 2B:
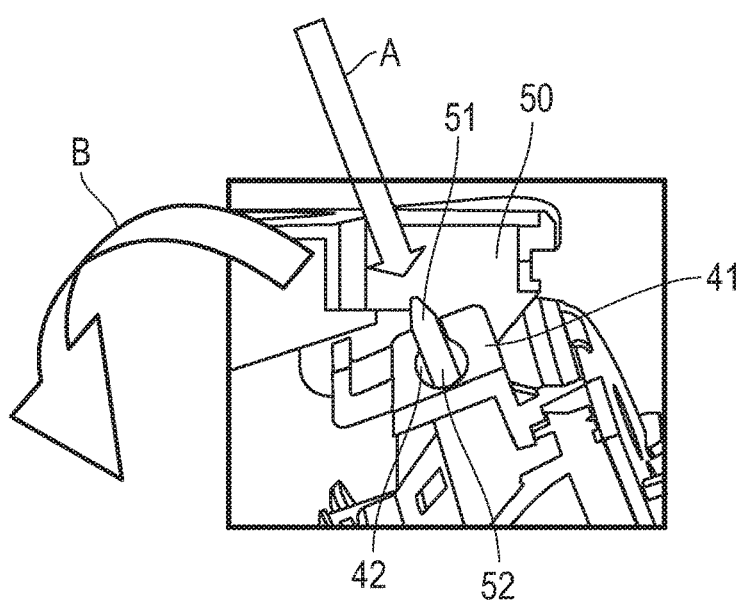
FIG. 2B is an enlarged side view of an upper part of the first sub assembly of the invention with the hinged bezel assembly.

A first sub assembly 10 is shown in FIG. 1A. The first sub assembly 10 may include a lower casing element 20 supporting an articulation assembly 30 with a shaft 31 thereof extending through the lower casing element 20. The articulation 30 assembly may be suited for moving the whole head assembly 70. In an example, attachment means 40 in the form of an upper cradle 41 and a lower cradle 44 are mounted on the articulation assembly 30. The upper cradle 41 may include two openings 42, one of which is shown in more detail in FIG. 1B and the other of which has the same principle structure. A bezel assembly 50 can be mounted on the first sub assembly 10 by inserting tabs 51 carrying an axle 52 into the openings 42 each of which has a narrow key way cross section in order to obtain a hinge connection between the upper cradle 41 and the bezel assembly 50, as shown in FIG. 2A. In fact each tab 51 is slid into the corresponding opening 42 provided in a conical datum of the upper cradle 41 from above as indicated by the arrow A in FIG. 2A such that the bezel assembly 50 can be rotated around the axle 52 as indicated by the arrow B in FIG. 2B.

Figure 3A:
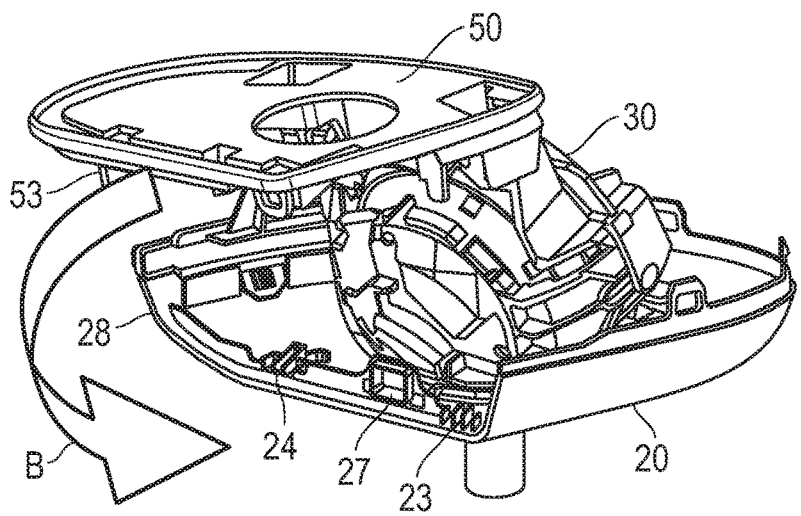
FIGS. 3A, 3B, and 3C are perspective views demonstrating the attachment of the bezel assembly to the first sub assembly to provide a second sub assembly by rotating the bezel assembly.
Figure 3B:
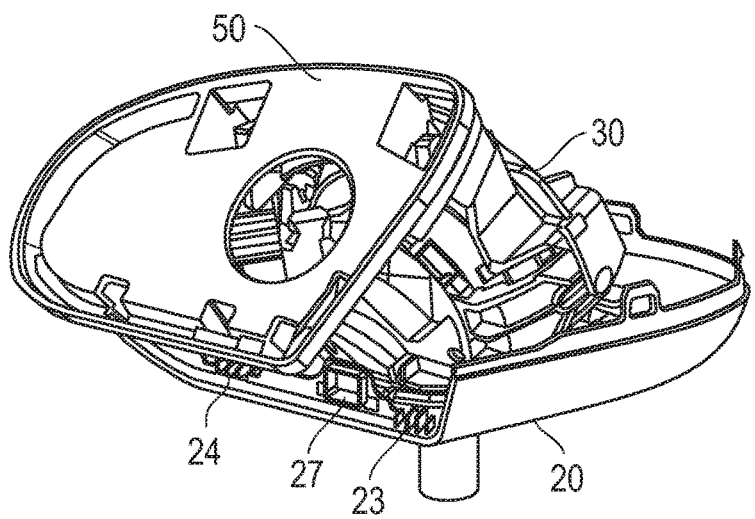
Figure 3C:
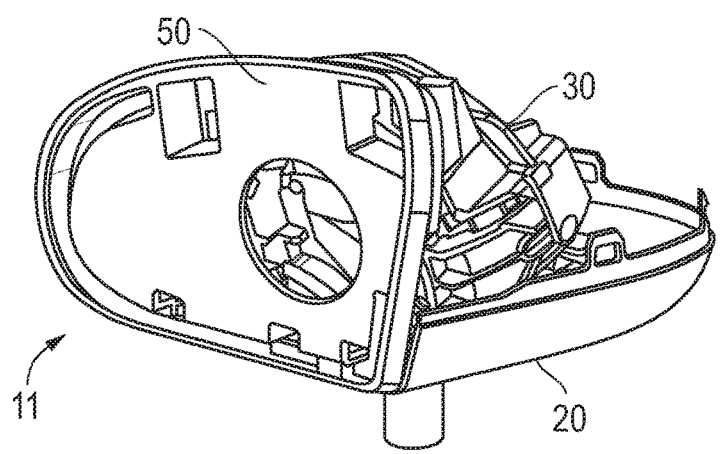
Figure 4A:
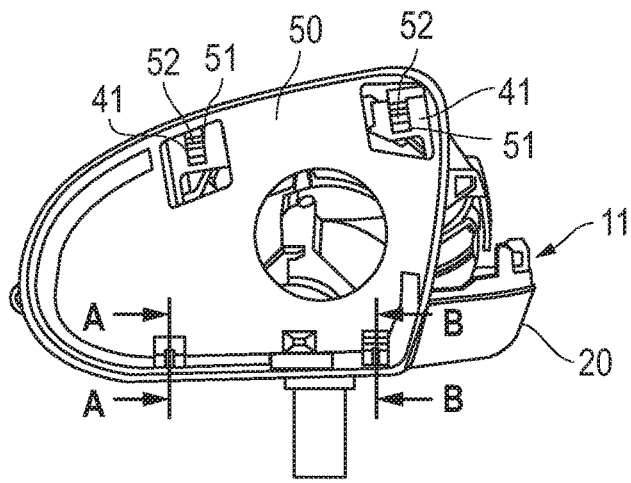
FIG. 4A is a front view of the second sub assembly.

Once the bezel assembly 50 is located into the upper cradle 41, as shown in FIG. 3A, it can be rotated down and clipped into the lower casing element 20, as shown in FIGS. 3B and 3C. As soon as the bezel assembly 50 is attached to the upper cradle 41 and the lower casing element 20, a second sub assembly 11 may be provided as shown in FIG. 3C. Attachment details of the bezel assembly 50 to the lower casing element 20 are described reference to FIGS. 4A to 4C. FIG. 4A illustrates the second sub assembly 11 with two cut lines A-A and B-B providing the two detailed FIGS. 4B and 4C. Both FIGS. 4B and 4C are showing a clip engagement between a clip element 23, 24 of the lower casing element 20 and a complementary clip element 53, 54 of the bezel assembly 50.

Figure 4B:
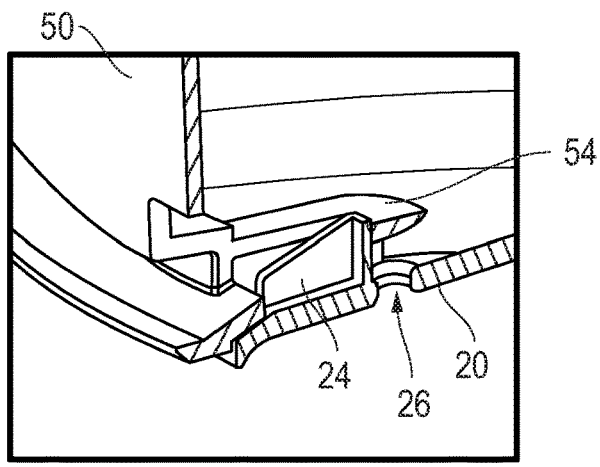
FIG. 4B and 4C are perspective views of clip connections of the second subassembly, taken along the line A-A and B-B of FIG. 4A, respectively.
Figure 4C:
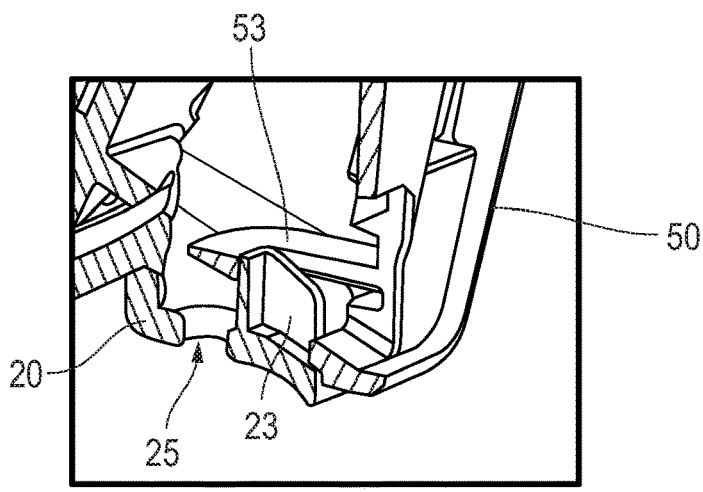

Both clip engagements shown in FIGS. 4B and 4C are arranged in the region of a rim 28 of the lower casing element 20, and on the left and on the right side in the front view of FIG. 4A. For dissembling the left clip engagement shown in FIG. 4B the clip element 54 can be relieved from the clip element 24 by applying a pressing action through a drain hole 26 within the lower casing element 20. The disassembly of the right clip engagement shown in FIG. 4C functions in a similar way by relieving the clip element 53 of the bezel assembly 50 from the clip element 23 of the lower casing element 20 through a further drain hole 25 provided within the lower casing element 20.

Figure 5A:
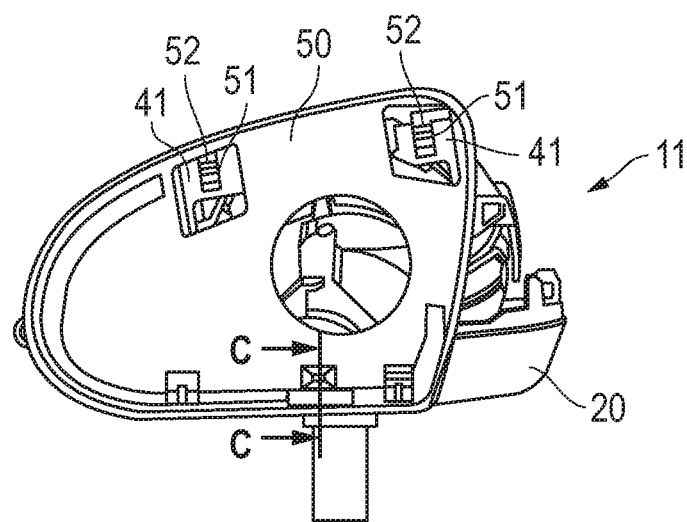
FIG. 5A is a front view of the second sub assembly as FIG. 4A.
Figure 5B:
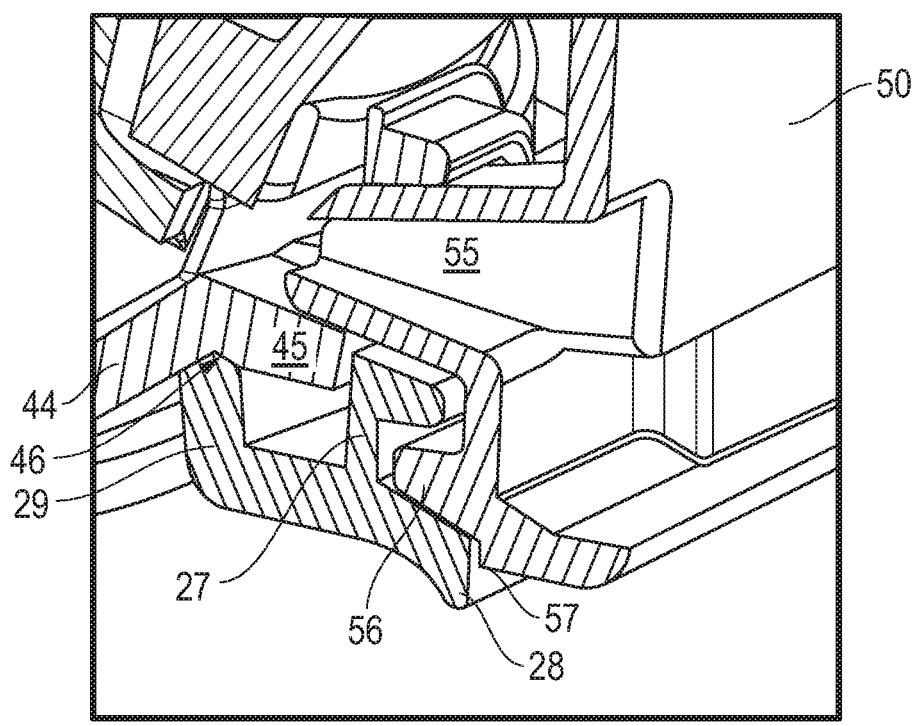
FIG. 5B is a perspective view of a locking connection of the second subassembly, taken along the line A-A of FIG. 5A.

FIG. 5A shows again the second sub assembly 11 with a cut line C-C, and FIG. 5B is depicting the respective section to provide further details on how the bezel assembly 50 is locked on the lower casing element 20 as well as the lower cradle 44 of the attachment means 40 of the articulation assembly 30. In fact, the bezel assembly 50 has a datum with a locking extension 55 entering a locking bracket 27 of the lower casing 20 and an abutment projection 56 entering a space defined by the lower part of the bracket 27 in the region of the rim 28 with a shoulder 27 of the datum providing a stop element by engaging the rim 28. In addition, the locking extension 55 engages an extension 45 of the lower cradle 44 which has the shape of an elbow in cross section providing a seat 46 for an upwardly extending extension 29 of the lower casing element 20. Thus, the bezel assembly datum forces the parts 20, 40 and 50 together.

Figure 6A:
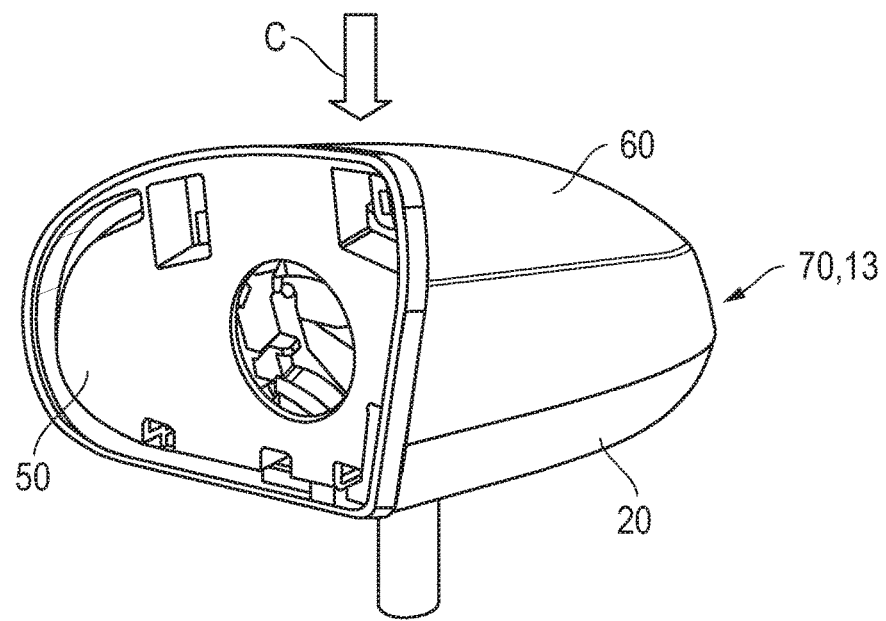
FIG. 6A is a perspective view of a third sub assembly in form of a head assembly of the invention.
Figure 6B:
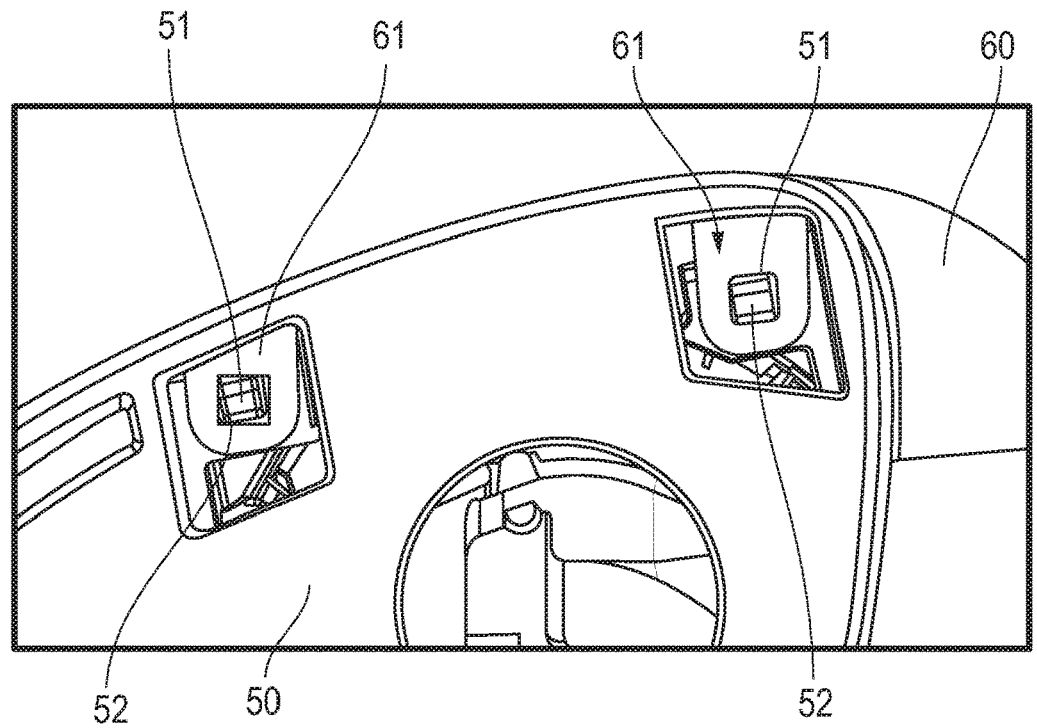
FIG. 6B is an enlarged side view of an upper part of the third sub assembly of FIG. 6A.

In order to provide the head assembly 70, an upper casing element 60 is to be attached from above as indicated in FIG. 6A by arrow C. FIG. 6A is depicting a third sub assembly 13 with the upper casing 60 and thus the head assembly 70. From FIG. 6B it can be seen that the upper casing 60 is clipped to the bezel assembly 50 as the tabs 51 enter hoop clips 61 of the upper casing 60.

Figure 7A:
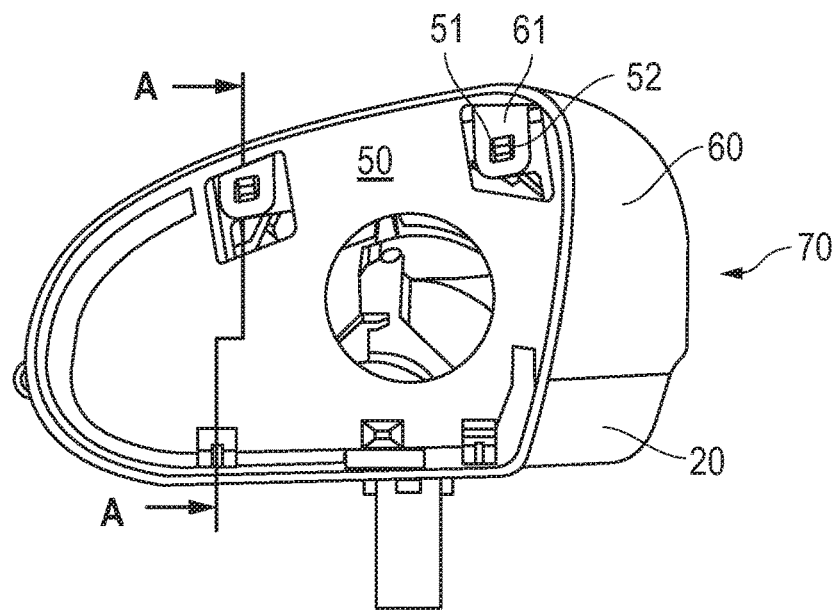
FIG. 7A is another perspective view of the third sub assembly.
Figure 7B:
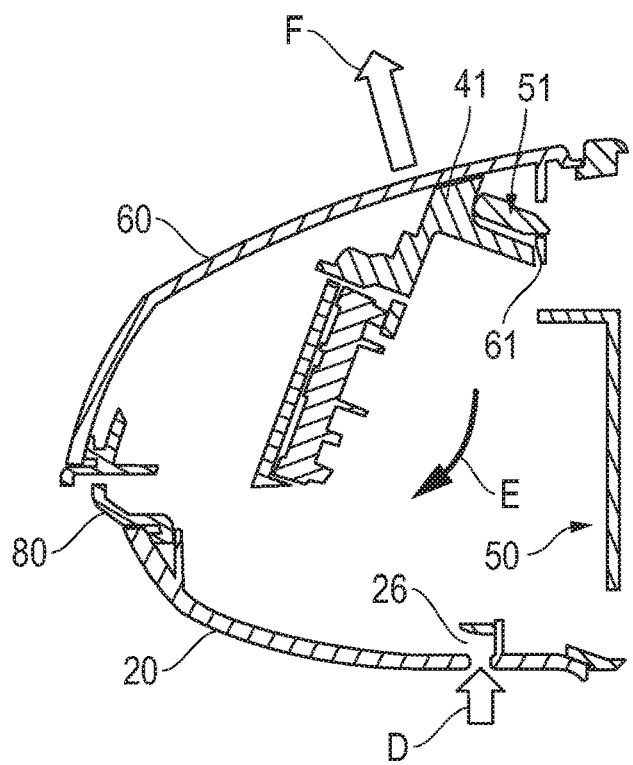
FIG. 7B is a cross section of the third subassembly, taken along the line A-A of FIG. 7A.

FIG. 7A shows another view of the head assembly 70 together with a cut line A-A. FIG. 7B provides a sectional view along this cut line after the lower clip engagements of the bezel assembly 50 have been relieved by applying a force through the drain holes 25, 26 in the direction of the arrow D in FIG. 7B. This allows the bezel assembly 50 to rotate as indicated by the arrow E. As the tabs 51 are integrated into the bezel assembly 50, the clips 61 of the upper casing element 60 are released when the bezel assembly 50 is rotating. While the bezel assembly 50 rotates upwardly, the upper casing element 60 will pop of as indicated by the arrow F in FIG. 7B.

Thus, the head assembly 70 is a simple hinged module with the bezel assembly 60 being rotatable around the respective hinge provided between the bezel assembly 50 and the upper cradle 41 and can be clipped together with the other parts of the head assembly 70; for example, the lower casing element 20, the lower cradle 44, as well as the upper casing element 60.

FIG. 7B also shows a latch connection 80 between the two casing elements 20, 60 which is releasable.

Figure 7C:
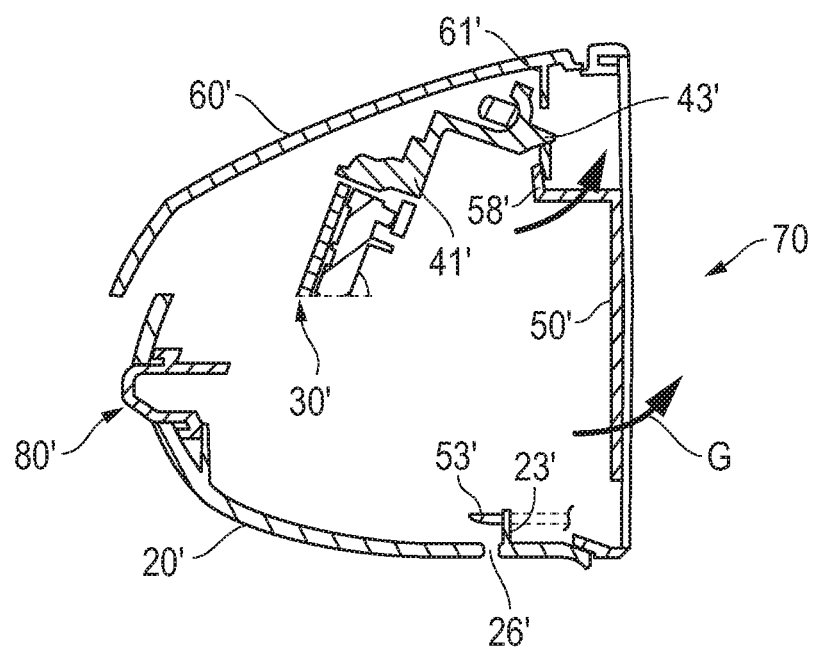
FIG. 7C is a cross section of a second embodiment of the head assembly of the invention.
Figure 7D:
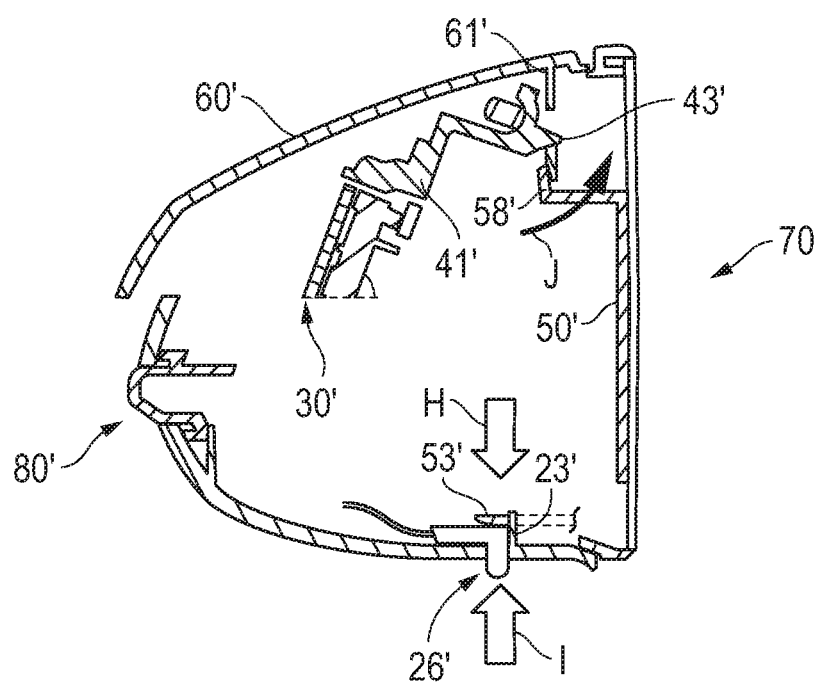
FIG. 7D is a cross section of a third embodiment of the head assembly of the invention.

FIGS. 7C and 7D show two examples of the head assembly. In both cases, the head assembly 70' still includes the lower casing element 20' with the clip elements 23' and the drain hole(s) 26', the articulation assembly 30', the attachment means with the upper cradle 41' and the lower cradle, the bezel assembly 50' with the clip elements 53', the upper casing element 60' with the hoop clips 61' and the latch connection 80'.

To further facilitate in particular the disassembly of the head assembly 70', the upper cradle 41' is provided with hooks 43' for entering the hoop clips 61' and the bezel assembly 50' is provided with a ledge 58' for engaging the hoop clips 61'. The ledge 58' levers the hoop clips 61' off the hooks 43' during rotation of bezel assembly 50' for disassembly. Still further, it is beneficial to use a plastic integrated spring positioned to force spring the bezel assembly 50' away when the hoop clips 61' are disengaged, as indicated by the arrows G in FIG. 7C.

In order to provide the rear view device, at least one rear view element can be attached to the bezel assembly also acting as a backing plate for e.g. an electrochromic mirror glass. Different further functions and devices can be incorporated into and/or controlled with the help of a rear view device comprising the head assembly of the invention, including in particular cameras. For example, one or more camera modules can be inserted into the bezel assembly.

FIG. 7D depicts a temperature sensor 90' inserted in the hole 26' of the lower casing element 20'. This allows not only to measure the temperature, but further facilitates the disassembly of the head assembly 70' as the temperature sensor 90' also fulfills the function of a button to release the clips connection between the lower casing element 20' and the bezel assembly 50' via the respective clip elements 23', 53'.

The clip element 53' of the bezel assembly 50' provides a downward pressure on the temperature sensor 90' when the head assembly 70' is assembled, see arrow H in FIG. 7D. This assists in fixing the temperature sensor 90'. In order to disassemble the head assembly 70', a pushing action is to be applied on the temperature sensor 90' as indicated by the arrow I in FIG. 7D. As soon as the clips connection between the lower casing element 20' and the bezel assembly 50' has been released, the bezel assembly 50' can start to rotate as indicated by the arrow J in FIG. 7D.

It is especially useful to integrate further functions and devices into the head assembly or rather the rear view device of the invention to enhance, extend and/or sustain the functionality of the rear view device during normal or extreme conditions. This may include heating and/or cooling means, cleaning means such as wipers, liquid and/or gaseous sprays, actuator means, e.g. the articulation assembly 30, for moving the rear view device or parts of it, such as a display, a camera system and/or parts of a camera system, including for example lenses, filters, light sources, adaptive optics like deformable mirrors, sensors and/or mirrors, and/or actuator means for inducing movement of other objects, for example parts of the vehicle and/or objects surrounding the vehicle. Furthermore, it can include linear tracks and/or rotating wheels, like for example a filter wheel, for exchanging optical elements, including for example lenses, mirrors, light sources, sensors, adaptive optics like deformable mirrors and/or filters.

Prominent examples for functions and devices incorporated into and/or controlled with the help of rear view devices include also illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

FIGS. 8A to 9D show a forth embodiment of an assembly of the invention on the basis of which the attachment of a bezel assembly 50" to a first sub assembly 10", in particular a cradle 41" of an attachment system 40" thereof, to provide a second sub assembly by rotating the bezel assembly 50" downwardly and connecting it to a lower casing element 20" is described, including the function of a turn signal indicator module 90" in securing the second sub assembly as well as closing gaps at the bezel assembly 50".

In detail, the first sub assembly 10" comprises parts of a mirror head 71" and a mirror foot 72", in particular in form of the lower casing element 20", an articulation assembly 30" for moving e.g. a mirror glass (not shown) and the attachment system 40", with the turn signal indicator module 90" being attached to the lower casing 20" as will be explained with reference to FIGS. 9A to 9D. As can be seen in FIGS. 8A to 8D, the articulation assembly 30" has a motor 32" attached to the cradle 41" of the attachment system 40" and a motor clamp 33" attached to the motor 32" as well as to the lower casing element 20". The cradle 41" is provided with openings 42" at its upper end, said openings 42" being suited for engaging tabs 51" provided together with a not shown axle a the upper end of the bezel assembly 50", with the openings 42" and the tabs 52" constituting a hinge connection in analogy to the ones described above.

As soon as the tabs 52" are engaged within the openings 42" the respectively formed hinge connection allows for the downward rotation of the bezel assembly 50" to finally connect the lower end of the bezel assembly 50" via its clips 53", 54" to the lower casing element 20". The respective clip connection results in urging the turn signal indicator module 90" outwardly against the lower casing element 20" resulting in closing the gap at the bezel assembly 50". A locking projection 55" of the bezel assembly 50" assists this closing.

Figure 9A:
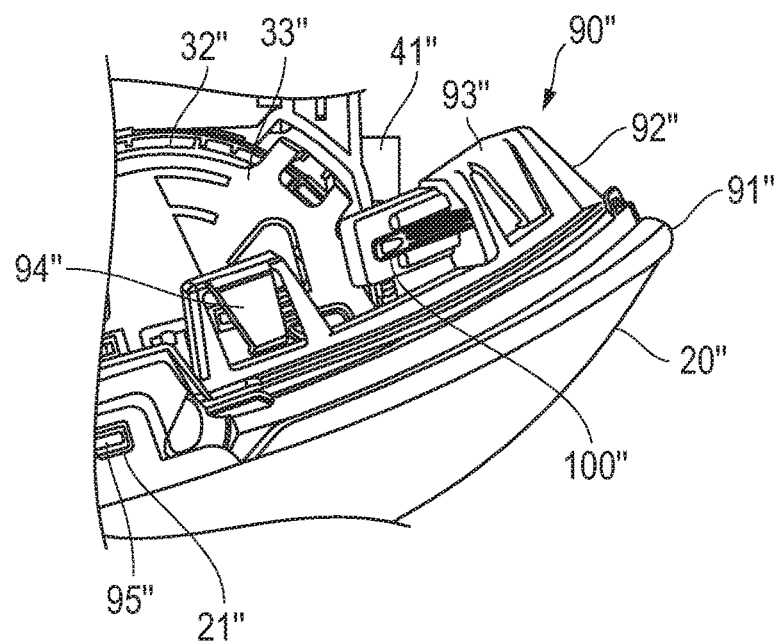
FIGS. 9A to 9D are perspective part-views of the forth embodiment of the invention explain the function of a turn signal indicator in securing the assembly.

The turn signal indicator module 90" may include a light window 91" and a housing 92", with the housing 92" being formed with clip elements 93", 94" for attachment to a not shown upper casing as well as clip elements 95" for attachment to the lower casing element 20" by engaging holes 21" of the lower casing element 20", as can be best seen in FIG. 9A. In another example, some or even all clip elements can be provided by the light window.

A Bluetooth module 100" shown to be attached to the turn signal indicator module 90" is preferably detachable and enables, for example, use of a smart phone as smart key to lock and unlock a vehicle to which a rear view device with the second assembly is attached.

Figure 9B:
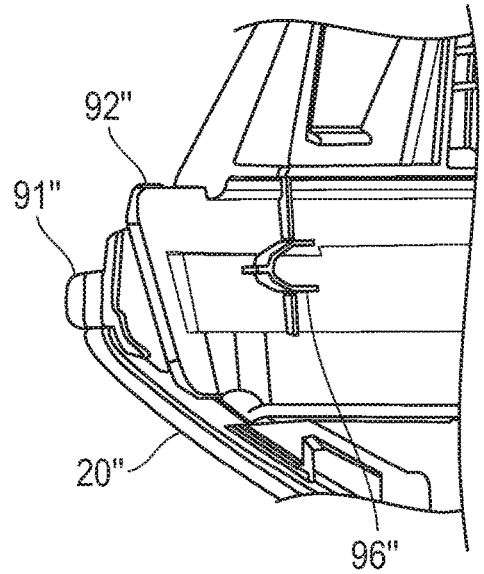
Figure 9C:
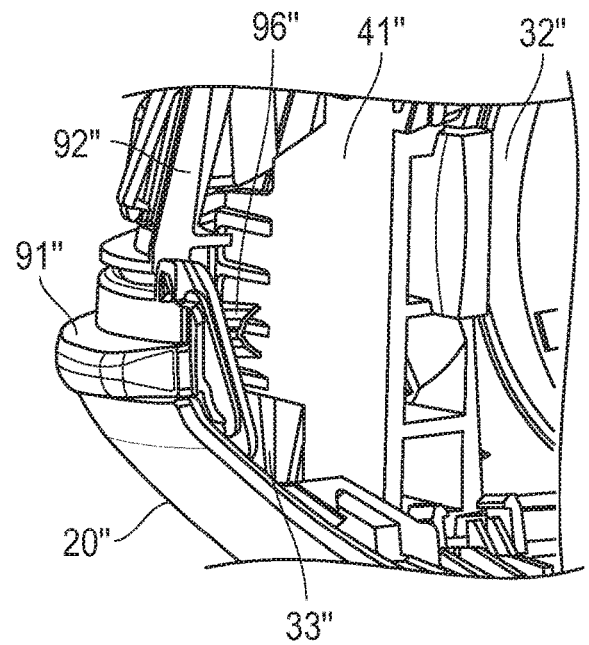
Figure 9D:
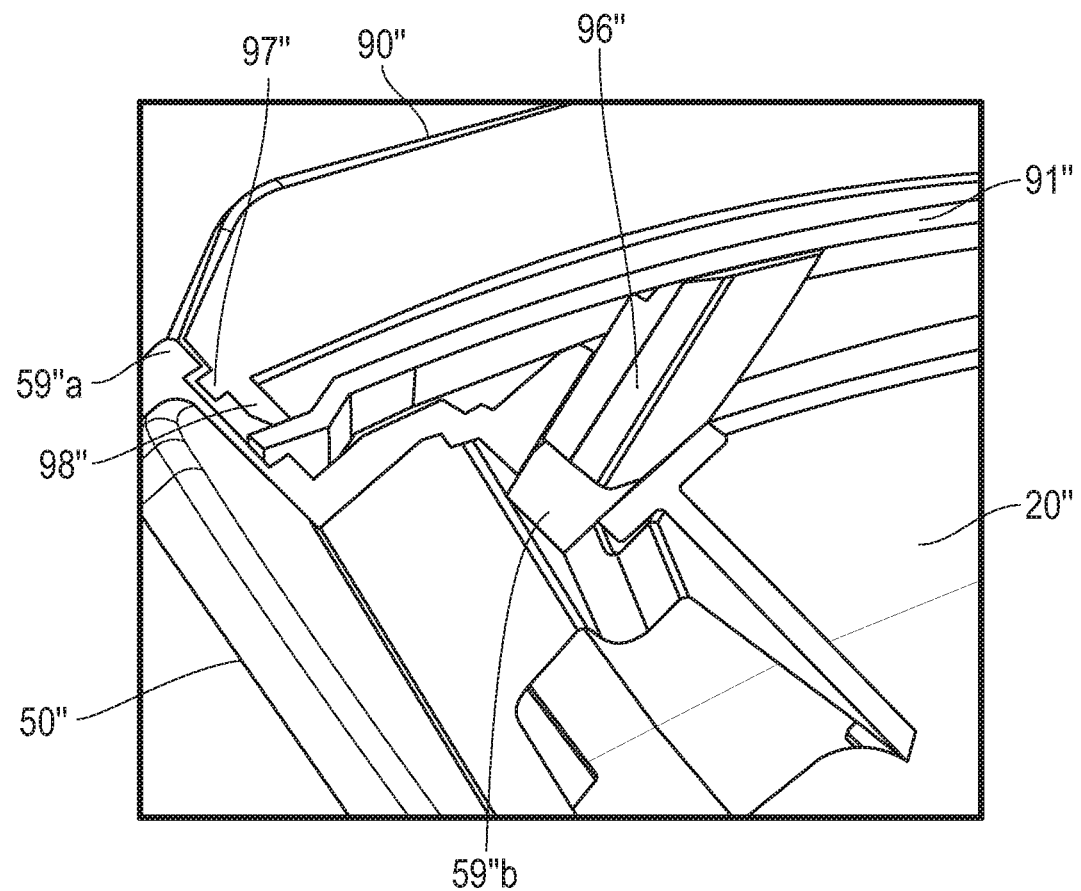

The turn signal indicator module 90" is provided with an arc shaped nose 96", see FIGS. 9B and 9C, which is forced into a recess provided by a projection 59b" of the bezel assembly 50" when clipsing the bezel assembly 50" to the lower casing element 20" which in turn results in urging a shoulder 97" of the turn signal indicator module 90" against a further, peripheral projection 59"*a* of the bezel assembly 50", see FIG. 9D. Thus, the turn signal indicator module 90" is pressed outwardly and against the lower casing element 20" which in turn closes the gap of the lower casing at the bezel assembly 50".

Figure 10A:
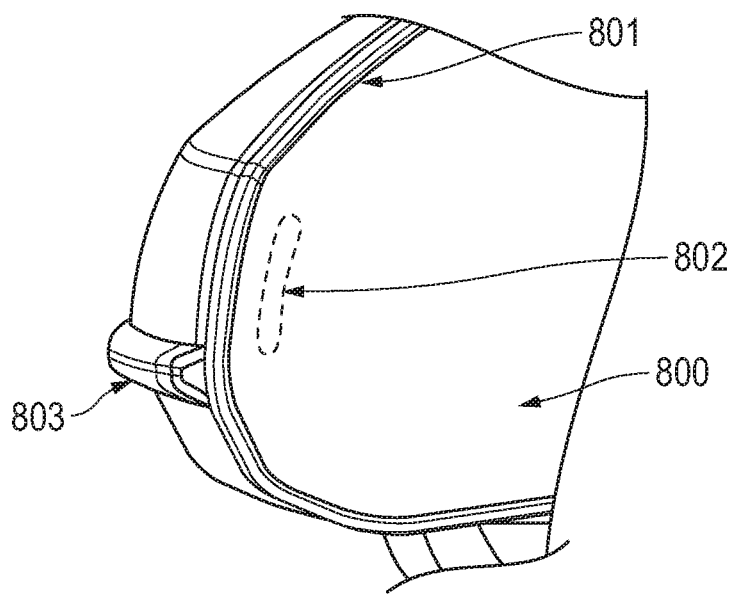
FIGS. 10A, 10B, and 10C are diagrams illustrating a fixed glass mirror assembly with a combined side turn indicator module and blind spot monitor module as a common assembly.

Referring to FIG. 10A, as alternative to the simple turn signal indicator module 90" a side turn indicator module (STI module) 803 and blind spot monitor (BSM module) 802, which are provided as a single, combined light module 804 as opposed to being two separate light modules, are shown in their final arrangement within a rear view device. The rear view device is provided with a glass 800 and a bezel 801, with the perspective part view of FIG. 10A illustrating that the indicator or light for the BSM module 802 is provided in the glass 800, whereas the STI module is arranged at the side of the bezel 801.

Figure 10B:
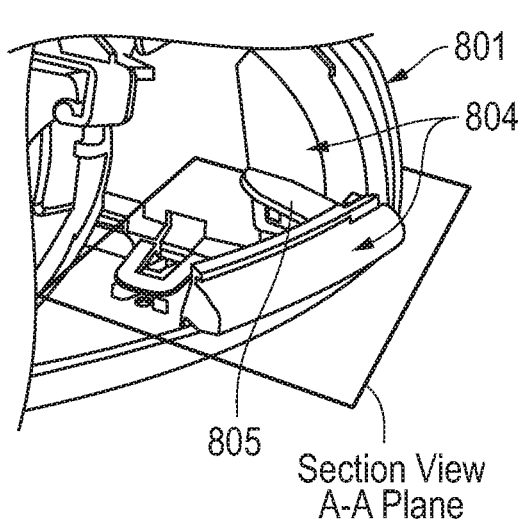
Figure 10C:
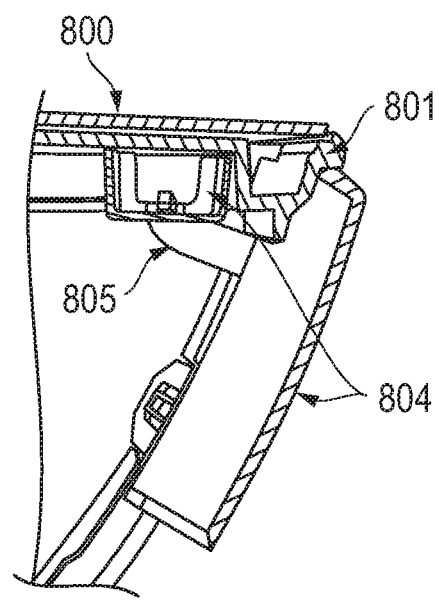

FIGS. 10B and 10C illustrate some details of the combined STI and BSM module 804, which is provided as a small module assembly in order to be integrated into the lower casing element. Combining the two modules gives the option to control them with the same or separate printed circuit boards/light sources. This also provides lower manufacturing cost, fewer parts and a more simple system that provides system as well as performance advantages.

The internal components of the combined STI and BSM module 804 are illustrated in the perspective part view of FIG. 10B. Accordingly, a connecting rib 805 is provided between the BSM portion 802 and the STI portion 803 of the combined module 804. A cross section further illustrating the inner portion and connection of the combined module 804 with the bezel 801 and the glass 800 is provided in FIG. 10C.

Figure 11:
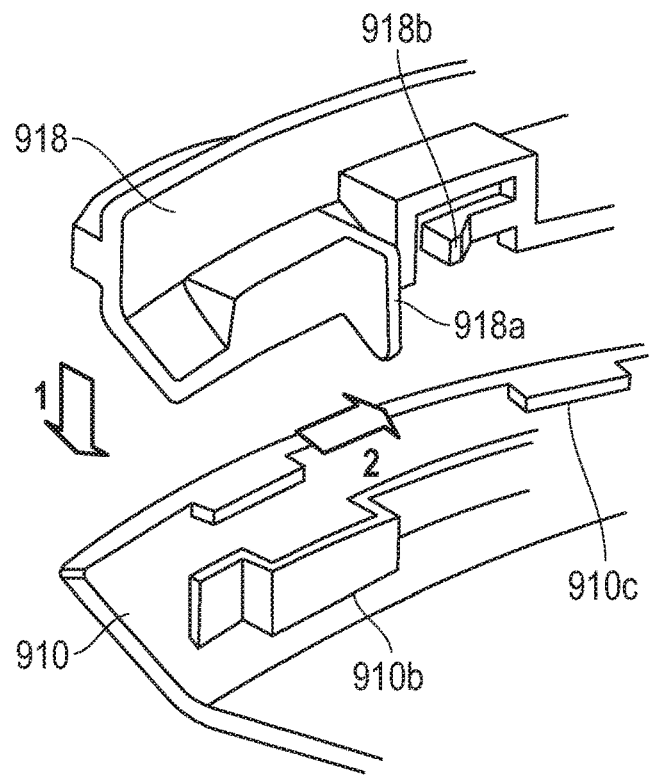
FIGS. 11 and 12 are diagrams illustrating attachment of a side turn indicator module with the lower casing of a rear vision device of the invention.
Figure 12:
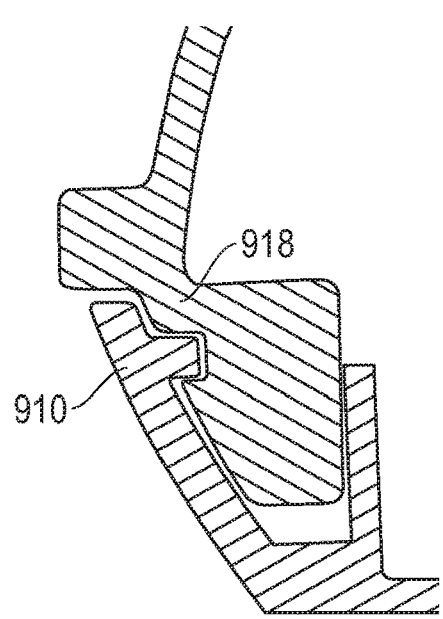

With respect to FIGS. 11 and 12 another example attachment of a light module such as a side turn signal indicator (STI) module 918 with a lower casing element 910 of a further rear view device of the invention is described. Although an STI module 918 is described, any other light module for other functions may be used.

Referring to FIG. 11, the STI module 918 is first pressed down onto the lower casing element 910. As a result, a STI tab 918*a* engages a tab receiving portion 910*b* of the lower casing element 910, and vertical control tabs 910*c* are engaged. Once fully pressed down onto the lower casing element 910, the STI module 918 can be slid along a curved edge of the lower casing element 910 until one or more retaining clips 918*b* of the STI module 918 are engaged.

FIG. 12 illustrates that once slid into place, the STI module 918 is locked in position. The STI module 918 to lower casing element 910 gap includes a series of the vertical control tabs 910*c* along the lower casing element 910 which allow locking of the STI module 918 in place.

Further examples for functions and devices incorporated into and/or controlled with the help of rear view devices may include for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An example for a rear view device including an illumination device fulfilling the brake light functions is disclosed in German patent application No. 102012108488, filed on Sep. 11, 2012 for REAR VISION ASSEMBLY FOR MOTOR VEHICLE and hereby incorporated herein by reference. A light guidance unit for an illumination device used in a back view system is disclosed in German patent application No. 102012104529, filed on May 25, 2012 for LIGHT GUIDANCE UNIT which is hereby incorporated herein by reference. An illumination device for a rear view device is disclosed in German patent application No. 102012107833, filed on Aug. 24, 2012 for ILLUMINATION DEVICE AND REAR VISION DEVICE which is hereby incorporated herein by reference. A lighting device for a back-vision unit is disclosed in German patent application No. 102012107834, filed on Aug. 24, 2012 for LIGHTING DEVICE AND BACK-VISION UNIT which is hereby incorporated herein by reference. A housing and display device of a rear view device is disclosed in European patent No. 2738043, filed on Dec. 3, 2012 for HOUSING AND DISPLAY DEVICE which is hereby incorporated herein by reference. An optical light guide for a vehicle lighting unit is disclosed in European patent No. 2947378, filed on May 22, 2014 for OPTICAL LIGHT GUIDE FOR A VEHICLE LIGHTING UNIT which is hereby incorporated herein by reference. A display device of a rear view device of a vehicle is disclosed in International patent application No. 2015/173695, filed on May 7, 2015 for DISPLAY DEVICE, REAR VIEW DEVICE AND MOTOR VEHICLE and claiming priority to European patent application No. 2944866, filed on May 12, 2014 for OPTICAL UNIT, DISPLAY DEVICE, REAR VIEW DEVICE AND MOTOR VEHICLE INCLUDING THE SAME which are all hereby incorporated herein by reference. Further a light guiding device for an illumination device, in particular for a motor vehicle or a display device, in a rear view device of a motor vehicle is disclosed in European patent application No. 3045944, filed on Jan. 19, 2015 for LIGHT GUIDING DEVICE which is hereby incorporated herein by reference. Still further a light guiding device for an illumination device, especially for a motor vehicle or an indicator device in a rear view device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE which are all hereby incorporated herein by reference. In addition, an illumination device, particularly for a rear-view device of a motor vehicle and a method for producing the same are disclosed in International patent application No. 2016/147154, filed on Mar. 18, 2016 for ILLUMINATION DEVICE AND METHOD FOR PRODUCING AN ILLUMINATION DEVICE and claiming priority to German patent application No. 102015104163, filed on Mar. 19, 2015 for ILLUMINATION DEVICE AND METHOD FOR PRODUCING AN ILLUMINATION DEVICE which are all hereby incorporated herein by reference. An improved rear-view device for a motor vehicle which includes an electronic device is disclosed in U.S. patent application Ser. No. 15/256,532, filed on Sep. 3, 2016 for ELECTRONIC DEVICE AND REAR-VIEW DEVICE and claiming priority to European patent application No. 3139711, filed on Sep. 3, 2015 for ELECTRONIC DEVICE AND REAR VIEW DEVICE which are all hereby incorporated herein by reference. A lighting device for a rear view device or a footwell device of a vehicle, including at least one luminous means is disclosed in German patent application No. 102015115555, filed on Sep. 9, 2015 for ILLUMINATION DEVICE, REAR VIEW DEVICE, FOOTWELL DEVICE AND VEHICLE which is hereby incorporated herein by reference. A light module for a light assembly of an exterior rear view device is disclosed in European patent application No. 3138734, filed on Sep. 3, 2015 for LIGHT MODULE, LIGHT ASSEMBLY AND REAR VIEW DEVICE FOR A VEHICLE which is hereby incorporated herein by reference. A lighting device for a vehicle component, in particular for a rear view device of a motor vehicle, including a logo lamp and a deflection mirror are disclosed in European patent application No. 3144183, filed on Sep. 13, 2016 for LIGHTING DEVICE, VEHICLE COMPONENT AND VEHICLE and claiming priority to German utility patent application No. 202015104894, filed on Sep. 15, 2015 for LIGHTING DEVICE, VEHICLE COMPONENT AND VEHICLE which are all hereby incorporated herein by reference.

A camera module can include in particular a plurality of different optical elements, including a.o. a variety of sensors and light sources, as well as housing parts.

The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3, filed on May 3, 2016 for CLEANING SYSTEM FOR A CAMERA and U.S. patent application Ser. No. 15/281,780, filed Sep. 30, 2016 for TELESCOPING REAR VISION ASSEMBLY WITH CAMERA AND LENS WIPING SYSTEM, which are all hereby incorporated herein by reference.

The camera can include for example CCD or CMOS or light field sensors, as for example described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which are all hereby incorporated herein by reference. Also an area of the sensor can be reserved for different purposes, for example to detect a test beam, as described in U.S. Patent No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference.

The optical elements can be molded or formed from any type of glass or any other suitable material. Glass is here used in the meaning of a non-crystalline amorphous solid showing a glass transition when heated towards the liquid state. It includes for example the group of polymeric glasses, metallic glasses, silica glasses, but any other suitable material showing the glass transition can also be used. The glass can be either in a flat, wedge, rectangular, cylindrical, spherical, conical, elliptical, and/or circular shape, as described for example in German patent application No. 102016108247.3, and German patent application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, which are all hereby incorporated herein by reference, or have a shape according to different needs or lens types. As non-limiting examples camera modules can be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REAR VIEW MIRROR SIMULATION, now U.S. Pat. No. 9,238,434, a Fresnel lens or micro lenses as described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed Sep. 8, 2010 for OPTIMAL LIGHT COUPLING FOR REAR VIEW DEVICES, which are all hereby incorporated herein by reference. Another type of optical elements know to be used in camera modules are optical fibers, especially in form of fiber bundles and preferably in form of fiber bundles having an optical head, as described for example in U.S. patent application Ser. No. 09/771,140. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference.

The optical elements can be transparent as described for example in U.S. Pat. No. 8,031,224, German patent application No. 102016108247.3, and U.S. patent application Ser. No. 13/242,829, filed Sep. 23, 2011 for CAMERA ARRANGEMENT AND DOOR HANDLE FOR MOTOR VEHICLE, which are all hereby incorporated herein by reference. But the optical elements can also be semitransparent, as described in U.S. patent application Ser. No. 09/771,140 and U.S. patent application Ser. No. 13/090,127, which are all hereby incorporated herein by reference. Still further, the optical elements can be completely or partially coated with different type of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference. Preferably the optical elements are made of a scratch-proof material as described for example in German patent application No. 102016108247.3, which is hereby incorporated herein by reference. The optical elements can have uncoupling structures at certain locations of the optical elements, and an optical film, for example an extrusion film, and a molded coating can be applied as described in German patent application No. 102011103200, which is hereby incorporated herein by reference. A coating to spectrally and stress control is described in U.S. patent application Ser. No. 15/124,310, which is hereby incorporated herein by reference. Different filters can be integrated into the optical elements such as for example gray filters or polarization filters, described in U.S. patent application Ser. No. 14/809,509, filed Jul. 27, 2015 for APPARATUS FOR LIGHT INTENSITY ADJUSTMENT, which is hereby incorporated herein by reference.

Electrochromic substrates, polymer electrolytes and other charge conducting medias may be used for the optical elements based on the descriptions of European patent application No. 08103179.1, filed on Mar. 31, 2008 for PROCESS FOR PRODUCING ELECTROCHROMIC SUBSTRATES AND ELECTROCHROMIC ARTICLES MADE THEREFROM, European patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, which are all hereby incorporated herein by reference.

The camera module can also be equipped with apparatuses for light intensity adjustment as described for example in U.S. patent application Ser. No. 14/809,509 and light level intensifier tubes as described in U.S. patent application Ser. No. 09/771,140, which are all hereby incorporated herein by reference. The electrochromic substrates and devices used in European patent application No. 08103179.1, European patent No. 2202826, U.S. Pat. No. 7,999,992 and U.S. Pat. No. 8,537,451, which are all hereby incorporated herein by reference, can also be used for this purpose as well as a transflector to transmit or reflect light based on a corresponding input signal, as described in German patent application No. 102016106126.3, filed on Apr. 4, 2016 for IMAGING SYSTEM, which is hereby incorporated herein by reference.

The camera module or a cover adapted to the camera module can be moved using different actuators, drives and/or a flexible track, as for example described in German application No. 102016108247.3 and U.S. patent application Ser. No. 15/281,780, which are all hereby incorporated herein by reference.

Still further, the camera module can also include cleaning elements to clean the optical element facing outwards and being exposed to the environment. The cleaning element can for example include wipers, brushes, lips, nozzles, fans and similar elements as are described in European patent application No. 14165197.6, filed Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, German patent application No. 102016108247.3, European patent application No. 13163677.1, filed Apr. 15, 2013 for LENS WIPER, European patent application No. 15173201.3, filed Jun. 22, 2015 for LENS CLEANING WITH FLEXIBLE ACTUATOR and European patent No. 1673260, filed on Oct. 14, 2003 for CLEANING DEVICE which are all hereby incorporated herein by reference. The cleaning devices are not limited in composition, and may for example include any fabric, elastomeric, sponge, brush, or combination of these. Special wiper elements including wiper arms, wiper blades, wiping cloth, wiping tissue and combinations thereof are described in European patent application No. 14165197.6, which is hereby incorporated herein by reference. A wiper element may for example be controlled according to the method described in European patent application No. 130164250.6, filed Apr. 18, 2013 for METHOD FOR CONTROLLING A WIPER DEVICE, which is hereby incorporated herein by reference. A reservoir for holding a cleaning liquid as described in European patent application No. 14165197.6, which is hereby incorporated herein by reference. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, which are all hereby incorporated herein by reference.

Also light sources can be installed or integrated into the camera module to increase the visibility of surrounding objects, measure distances and directions and detect dirt, such as described in U.S. Pat. No. 8,031,224, U.S. patent application Ser. No. 62/470,658, filed on Mar. 13, 2017, 2016 for LIGHT EMITTING MIRROR BEZEL and U.S. patent application Ser. No. 09/771,140, which are all hereby incorporated herein by reference.

Different heating means, like heating coils, heating devices integrated into the lens holder or the bezel, or other heating elements can be used to impede condensation and icing at the surface of optical elements, as for example described in German patent application No. 102016108247.3, U.S. patent application Ser. No. 62/470,658, and German patent application No. 102016107545.0, filed on Apr. 22, 2016 for HEATING DEVICE FOR A CAMERA LENS, which are all hereby incorporated herein by reference.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference.

In another example, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0, which is hereby incorporated herein by reference.

A conductor track can be embedded within plastic parts of the camera module as described in European patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, which are all hereby incorporated herein by reference.

The camera module can include a power harvesting system as described for example in European patent application No. 09171683.7, filed on Sep. 29, 2009 for SELF SUSTAINING REAR VIEW MIRROR, which is hereby incorporated herein by reference.

A fault detection system for electric consumers as described in U.S. Pat. No. 8,487,633 filed on Jan. 14, 2010 for FAULT DETECTION OF ELECTRIC CONSUMERS IN MOTOR VEHICLES, which is hereby incorporated herein by reference, can be used to detect failure of the camera module.

Different types of fixings can be used to fix the camera module to the vehicle or other components, such as for example the snap-fit connection described in European patent No. 2233360, filed on Mar. 27, 2009 for SNAP FIT CONNECTION IN A REAR VIEW MIRROR, which is hereby incorporated herein by reference.

Different control means and analyzing devices can be used, such as the computation units described in U.S. patent application Ser. No. 13/090,127, German patent application No. 102016106126.3, German patent application No. 102011053999, European patent No. 2146325, filed on July 16, for Recording Device for Receiving, Processing and Storing Image Files in a Vehicle and Method, and U.S. Pat. No. 8,849,104, filed on Jul. 16, 2008 for RECORDING DEVICE AND METHOD FOR CAPTURING AND PROCESSING IMAGE DATA IN A VEHICLE, which are all hereby incorporated herein by reference. In addition, HDR (high dynamical range) technology can be used according to U.S. patent application Ser. No. 14/830,406, filed on Aug. 19, 2015 for REAR VIEW DEVICE FOR A MOTOR and published as US 20150358590, which is hereby incorporated herein by reference.

Although modifications and changes may be suggested by those skilled in the art, it is the intention of the application to embody within the patent warranted hereon all changes and modifications as reasonably and probably come within the scope of this contribution to the art. The features of the present invention which are believed to be novel are set forth in detail in the appended claims. The features disclosed in the description, the figures as well as the claims could be essential alone or in every combination for the realization of the invention in its different embodiments.

REFERENCE SIGNS 10, 10" first mirror sub assembly
11 second mirror sub assembly
13 third mirror sub assembly
20, 20', 20" lower casing element
21" attachment hole
23, 23' clip element
24 clip element
25 drain hole
26, 26' drain hole
27 locking bracket
28 rim
29 extension
30, 30', 30" articulation assembly
31 shaft
32" motor
33" motor clamp
40, 40" attachment means
41, 41', 41" cradle
42, 42" opening
43' hook
44 lower cradle
45 extension
46 seat
50, 50', 50" bezel assembly
51, 51" tab
52 axle
53, 53', 53" clip element
54, 54" clip element
55, 55" locking projection
56 abutment projection
57 stop shoulder
58' ledge
59a" projection
59b" projection
60, 60' upper casing element
61, 61' hoop clips
70, 70' head assembly
71" mirror head
72" mirror foot
80, 80' latch connection
90" turn signal indicator module
91" light window
92" housing
93" clip element
94" clip element
95" clip element
96" nose
97" shoulder
98" projection
100" Bluetooth module
800 mirror glass
801 mirror bezel
802 blind spot monitor
803 side turn indicator
804 BSM-SDI module
805 connecting rib
910 lower casing
910b tab receiving portion
910c vertical control tabs
918 turn signal indicator module
918a STI tab
918b STI clip

What is claimed is:

1. An assembly having a head assembly for an external rear view device configured to be attached to a motor vehicle, the assembly comprising:
a lower casing element;
an upper casing element;
an articulation assembly;
a bezel assembly for carrying at least one rear view element; and
a hinge connection between the bezel assembly and a first sub assembly provided by at least the lower casing, the articulation assembly and an attachment means with the articulation assembly being mounted on the attachment means or the attachment means being mounted on the articulation assembly;
at least one of a snap, a latch, and a clip connection between the bezel assembly and the first sub assembly to provide a second sub assembly which comprises the first sub assembly and the bezel assembly, and at least one of a snap, a latch, and a clip connection between the bezel assembly and the upper casing element, between the upper casing element and the attachment means, and between the upper casing element and the lower casing element, to provide a third sub assembly which comprises the second sub assembly and the upper casing element.

2. The assembly of claim 1,
wherein the hinge connection is provided between one end of the bezel assembly and a cradle of the attachment means, and allows for a rotation of the bezel assembly, and
the hinge connection is between an upper end of the bezel assembly and an upper end of the cradle to allow for a downward rotation of the bezel assembly to attach the bezel assembly to the lower casing via at least one of a snap, a latch and a clip connection.

3. The assembly of claim 1, wherein the hinge connection is provided by
at least one of an opening or a slot, with the opening or the slot having a narrow key way cross section, and
at least one of an axle, a hook and a tab configured to be inserted into the at least one of the opening and the slot,
wherein the at least one of the opening and the slot is provided by the cradle so that the at least one of the axle, hook, and tab of the bezel assembly can be inserted from above into the at least one of the opening and the slot.

4. The assembly of claim 1, further comprising one or more of:
at least one of a first snap, latch and clip connection between the bezel assembly between a lower end of the bezel assembly and the lower casing element;
at least one of a second snap, latch and clip connection between the bezel assembly between the lower end of the bezel assembly and a lower cradle of the attachment means;
at least one of a third snap, latch and clip connection between the bezel assembly between the lower end of the bezel assembly and a lower cradle of the attachment means as well as the lower casing element;
at least one of a forth snap, latch and clip connection between the bezel assembly between an upper end of the bezel assembly and the upper casing element;
at least one of a fifth snap, latch and clip connection between the attachment means between an upper cradle of the attachment means and the upper casing element;
at least one of a sixth snap, latch and clip connection between the lower casing element and the upper casing element;
at least one of a seventh snap, latch and clip connection between a turn signal indicator module, and at least one of a blind spot monitor module, the lower casing element, and the upper casing element; and
at least one of an eighth snap, latch and clip connection between a Bluetooth module and a light module, the lower casing element and the upper casing element.

5. The assembly of claim 1, wherein the lower casing element is provided with at least one hole functioning as a drain hole and/or enabling relieving a first, third, sixth, seventh and/or eighth snap, latch and/or clip connection.

6. The assembly of claim 1, further comprising at least one of a button and a functional module, comprising at least one of a turn signal indicator module, a blind spot monitor module, a camera module, a Bluetooth module, a sensor module, and a temperature sensor which is moveably insertable in the hole.

7. The assembly of claim 6, wherein the turn signal indicator module and the blind spot monitor module are formed as a single unit immovably attached to each other in form of a combined module and share at least one of a light source or a printed circuit board.

8. The assembly of claim 4, wherein at least one of
the one or more of the first, third, sixth, seventh and eighth snap, latch and/or clip connection comprises at least one element in the region of a rim of the lower casing element and/or integrally formed with the lower casing element, and
the one or more of the first, second, third and fourth snap, latch and/or clip connection comprises at least one element integrally formed with the bezel assembly.

9. The assembly of claim 6, wherein at least one of
attachment of the bezel assembly to the lower casing comprises fixing the at least one of the button and the functional module within the head assembly or closing a gap between the upper or lower casing on one side and the bezel assembly on the other side,
at least one clip element of the bezel assembly, at least one nose, shoulder or projection of the button, or the functional module is suited for fixing the at least one of the button and the functional module.

10. The assembly of claim 9, wherein at least one of
the turn signal indicator module is provided with at least one arc shaped, first nose or projection engaging, a U shaped recess of, a projection of the bezel assembly, and
the turn signal indicator module is provided with at least one second nose, shoulder or projection engaging a further projection of the bezel assembly.

11. The assembly of claim 4, wherein
the light module comprises one or more tabs and one or more clips,
the lower casing element comprises one or more tab receiving portions, and
the one or more tab receiving portions of the lower casing element are configured to receive the one or more tabs of the light module.

12. The assembly of claim 4, wherein the light module is configured to lock and attach to the lower casing element by pressing the light module on the lower casing element and sliding the light module with respect to the lower casing element, with the light module sliding along a curved edge of the lower casing element until one or more retaining clips are engaged, or the light module being locked in position via a series of vertical control tabs along the lower casing element.

13. The assembly of claim 4, wherein one or more of
at least one of a third snap, latch and clip connection is provided by at least one element integrally formed with the lower cradle,
the bezel assembly is provided with at least one first projection suited for extending through a bracket of the lower casing element and engaging the lower cradle,
the bezel assembly is provided with at least one second projection suited for being inserted into a recess provided by the lower casing element,
the bezel assembly is provided with at least one shoulder suited to act as a stop element, by abutting against the rim of the lower casing element, and
the lower casing element is provided with an extension suited for engaging the lower cradle for resting in a seat provided by the lower cradle when the second or third sub assembly is assembled.

14. The assembly of claim 13, wherein the first projection, the second projection and the shoulder are provided by a datum of the bezel assembly.

15. The assembly of claim 4, wherein the at least one of the forth snap, latch and clip connection is provided by at least one hoop clip of the upper casing element into which a tab of the bezel assembly or at least one hook of the upper cradle is inserted.

16. The assembly of claim 15, wherein the at least one of the fifth snap, latch and clip connection is provided by at least one projection or ledge of the bezel assembly suited to engage the at least one hoop clip of the upper casing element.

17. The assembly of claim 1, further comprising a spring element acting on the bezel assembly.

18. A method for assembling the assembly according to claim 1, comprising:
provuding the first sub assembly with the turn signal indicator module attached to the lower casing;
hinging the upper end of the bezel assembly into the first sub assembly via the cradle or upper cradle;
rotating the lower end of the bezel assembly downwardly against the force of the spring element; and
clipping the lower end of the bezel assembly at least to the lower casing element to form the second sub assembly.

19. The method for assembling the assembly according to claim 18, further comprising clipping the upper casing element onto the second sub assembly and onto the bezel assembly or the cradle or upper cradle and the lower casing element.

20. A method for dissembling the assembly of claim 1, comprising:
relieving the connection between the lower end of the bezel assembly and the lower casing element, the bezel assembly, the lower casing element and the lower cradle, through at least one of the hole or via the button or via the functional module within the lower casing element; and
rotating the lower end of the bezel assembly via the force of the spring element, upwardly and hereby releasing the upper casing element.

21. The method for dissembling the head assembly according to claim 20, further comprising drawing the bezel assembly out of the hinge connection with the cradle or upper cradle.

22. A rear view device with an assembly of claim 1, wherein at least one rear view element is attached to the bezel assembly, with the rear view element comprising at least one of a reflective element and a camera, and the articulation assembly is suited to move at least the at least one rear view element.

23. A motor vehicle with at least one rear vision device of claim 22, wherein at least the cradle or upper cradle is moveably attached to the motor vehicle via a foot assembly fixed to the motor vehicle.

* * * * *